United States Patent
Banavar et al.

(10) Patent No.: US 6,802,058 B2
(45) Date of Patent: Oct. 5, 2004

(54) METHOD AND APPARATUS FOR SYNCHRONIZED PREVIEWING USER-INTERFACE APPEARANCE ON MULTIPLE PLATFORMS

(75) Inventors: Guruduth Somasekhara Banavar, Yorktown Heights, NY (US); Lawrence D. Bergman, Mt. Kisco, NY (US); Tatiana Kichkaylo, Jersey City, NJ (US); Jeremy Sussman, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 09/852,281

(22) Filed: May 10, 2001

(65) Prior Publication Data

US 2004/0015893 A1 Jan. 22, 2004

(51) Int. Cl.⁷ .................................................. G06F 9/45
(52) U.S. Cl. ....................... 717/138; 717/105; 717/134; 345/763; 345/771; 345/970
(58) Field of Search ................................ 717/104–139; 703/22, 36, 27; 715/513–525; 345/760–847, 969–970, 1.1–1.3, 2.1–2.3, 733–747

(56) References Cited

U.S. PATENT DOCUMENTS 5,461,708 A * 10/1995 Kahn .......................... 345/440

OTHER PUBLICATIONS

Eisenstein et al., "Applying Model–Based Techniques to the Development of UIs for Mobile Computers", ACM, pp. 69–76, Jan. 2001.*
Dinesh et al., "Specifying Input and Output of Visual Languages", CiteSeer, http://citeseer.nj.nec.com/196583.html, pp.: 1–22, 1996.*
Alfred Kobsa, "Supporting User Interfaces for All Through User Modeling", Proceedings HCI International '95, Yokohama, Japan, http://www.ics.uci.edu/~kobsa/papers/1995-HCl95-kobsa.pdf, pp. 1–4, 1995.*

* cited by examiner

Primary Examiner—Tuan Dam
Assistant Examiner—Ted T. Vo
(74) Attorney, Agent, or Firm—Douglas W. Cameron, Esq.; McGinn & Gibb, PLLC

(57) ABSTRACT

A method and structure for emulating on a single display platform an application's user interface as it would appear on each of a number of target devices, given a set of device characteristics for any device to be emulated and a formal description of one or more applications to be emulated. The method includes combining a selected one or more of the device characteristics and a selected one of the application formal descriptions and providing a simultaneous and consistent display representation for the selected application, so as to provide a stylized rendering of the selected application's interface in a uniform appearance and in which the selected application's interface for more than one target device can be simultaneously viewed. The method also synchronizes the display representation, so that a simultaneous update to all of the selected target device representations is updated when information in a device-independent portion of the formal description is changed.

24 Claims, 13 Drawing Sheets

```
Application Name="JobFair"                                        100
  Interactor Name="LastName" Type="Input"                         110
    Property Name="label" Value="LastName: "                      120
  Interactor Name="SkillsList" Type="SelectableList"              130
    Property Name="label" Value="Skills:"                         140
    Property Name="multipleSelect" Value=false                    150
  Interactor Name="BoothsList" Type="SelectableList"              160
    Property Name="label" Value="Booths:"                         170
    Property Name="multipleSelect" Value=true                     180
```

FIG.5A

```
Device Name="PalmPirate"       100
  Toolkit Name="myToolkit"     110
  Screen Width=150 Height=150  120
```

FIG.5B

```
Toolkit Name="myToolkit"                                          100
  Mapping InteractorName="Input" Widget="EntryField"              110
    Sizing Name="Width" Value=(10*label.numChars)                 120
    Sizing Name="Height" Value=(20)                               130
  Mapping InteractorName="SelectableList" Widget="ChoiceList"     140
    Sizing Name="Width" Value=(100)                               150
    Sizing Name="Height" Value=(100)
```

FIG.5C

| | |
|---|---|
| Application Name="JobFair" Device="PalmPirate" Toolkit="myToolkit" | 100 |
|   Screen Name="Screen1" | 110 |
|     Widget Type="myToolkit.EntryField" | 120 |
|       Attribute Name="Text" Value="LastName:" | 130 |
|       Attribute Name="Position" Value=(20,20) | 140 |
|       Attribute Name="Size" Value=(100,20) | 150 |
|     Widget Type="myToolkit.ChoiceList" | 160 |
|       Attribute Name="Label" Value="Skills:" | 170 |
|       Attribute Name="Position" Value=(20,60) | 180 |
|       Attribute Name="Size" Value=(100,100) | 190 |
|       Attribute Name="Multi" Value=false | 200 |
|   Screen Name="Screen2" | 210 |
|     Widget Type="myToolkit.ChoiceList" | 220 |
|       Attribute Name="Text" Value="Booths:" | 230 |
|       Attribute Name="Position" Value=(20,20) | 240 |
|       Attribute Name="Size" Value=(100,100) | 250 |
|       Attribute Name="Multi" Value=true | 260 |

FIG.5D

UI Model description file

Application Name="JobFair"                                              100
Interactor Name="LastName" Type="Input"  ObjID=1                        110
Property Name="label" Value="LastName:"                                 120

Device-specific layout specification file

Application Name="JobFair" Device="PalmPirate" Toolkit="myToolkit"      200
Screen Name="Screen1"                                                   210
Widget Type="myToolkit.EntryField"  ObjID=1                             220
Attribute Name="Text" Value="LastName:"                                 230
Attribute Name="Position" Value=(20,20)                                 240
Attribute Name="Size" Value=(100,20)                                    250

FIG.9B

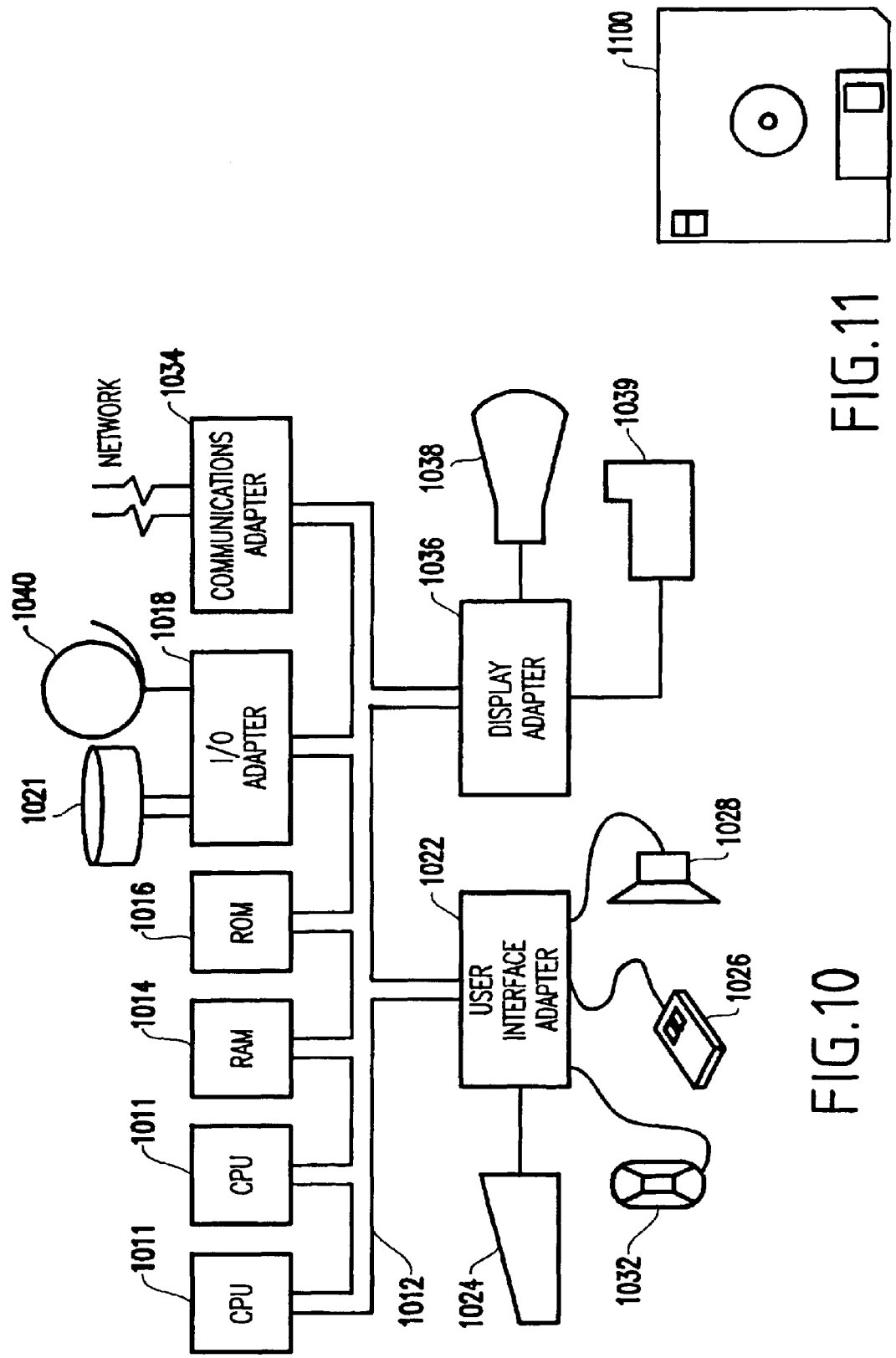

METHOD AND APPARATUS FOR SYNCHRONIZED PREVIEWING USER-INTERFACE APPEARANCE ON MULTIPLE PLATFORMS

BACKGROUND OF THE INVENTION

1. Field of the Invention

The present invention generally relates to the generation of user-interface representations across multiple platforms. Specifically, a graphic user interface presentation developed for a specific device or platform and a specific application is converted into an abstract presentation allowing a designer to immediately get a sense of the layout in terms of size and position of the user-interface entities. Device-specific emulators are eliminated by linking a device-independent model to device-dependent multiple views for either a single device or multiple devices for simultaneous, consistent, and synchronized stylized rendering on a commonly available viewing device such as a personal computer display device.

2. Description of the Related Art

With the growing proliferation of mobile computing devices, development of technology to support applications for these devices has been increasingly important. Of particular importance in the future will be technology that supports application development for deployment on multiple devices, including mobile phones and personal digital assistants (PDAs).

However, a problem when developing software intended for multi-device deployment is previewing the user-interface, particularly on devices that have graphical user-interfaces (GUIs). Each device has different interface characteristics, including display size, resolution, and user-interface widget characteristics. Some of these, such as display size, are inherent characteristics of the device. Others are a function of the user-interface toolkit or GUI toolkit employed. Some devices provide support for multiple toolkits. For purposes of the present application, the term "device", meaning typically one of potentially many devices, on which a user interface is to be deployed, is referred to as a "target device".

Currently, a software developer or designer has several options when building software intended for multi-device deployment. A first option is to actually run the software on each of the target devices. This requires downloading executable code to each device and viewing its operation in situ. This can be time-consuming and requires that the developer have access to each of the target devices. Access becomes increasingly difficult as the types of devices available proliferates.

A second option is to run emulators. This obviates the necessity of having a separate physical unit for each type of device to be tested. An emulator gives an accurate rendering of the interface on a different device, for example, displaying on a desktop PC emulator what one would see on a particular model of mobile phone. It also typically provides a simulation of interaction with that device, using whatever input modes are available on the host device, meaning whatever input modes are available on the device running the emulation. Thus, a mobile phone emulator might simulate the pressing of keypad buttons using soft buttons activated by a "point and click" mouse.

However, while emulation eliminates the need for a separate testing device for each hardware platform to be supported, there are still problems with this approach. For example, software emulators are not always available. Even when emulators can be obtained, running a number of emulators can be unwieldy and cumbersome. Each emulator runs as a stand-alone program. Each must be initialized, loaded with the code to be tested, and viewed separately. Although this might be reasonable for final "production" code, code under development typically requires that changes/updates be viewed frequently. Finally, each emulator is typically a separate program, which must be obtained, learned, and managed. Dealing with a large suite of emulators when developing multi-platform software can be quite burdensome.

SUMMARY OF THE INVENTION

In view of the foregoing and other problems, disadvantages, and drawbacks of the conventional methods, the present invention provides a method (and system) for previewing user-interfaces on multiple platforms. In the following discussion, the term "simultaneous" means the display representation at the same time on a display device of an application as used on multiple devices. The term "consistent" means that all the display representations provide a uniform appearance. The term "synchronized" means that any changes to the device-independent specification will reflect in all views simultaneously. The term "display representation" means a stylized rendering of an application interface.

Therefore, it is an object of the present invention to provide a method for simultaneously previewing user-interfaces on multiple platforms with a consistent stylized rendering of application interfaces.

It is also an object of the present invention to provide a method in which the stylized rendering is synchronized so that any changes to a device-independent specification will simultaneously reflect in all views.

It is also an object of the present invention to provide a method in which a graphic user interface presentation developed for a specific device or platform and a specific application is converted into an abstract presentation allowing a designer to immediately get a sense of the layout in terms of size and position of the user-interface entities.

It is also an object of the present invention to provide a method whereby device-specific emulators are eliminated by providing a device-independent model linked to device-dependent multiple views for either a single device or for multiple devices for simultaneous, consistent, and synchronized viewing on a commonly used viewing device such as a personal computer.

It is also an object of the present invention to eliminate the need to download/run separate emulators for each target platform.

It is also an object of the present invention to provide a method and apparatus whereby all views of a target device user interface could be viewed at the same time.

It is also an object of the present invention to provide a method and apparatus whereby all views of a single target device or of multiple target devices are consistent.

It is also an object of the present invention to provide a method and apparatus whereby it is easy to preview new devices, even if emulators are not available.

It is also an object of the present invention to provide a development tool for use in multi-platform development and environments, for use in development of new devices, and for use in integrated software development environments.

It is also an object of the present invention to provide a stand-alone multi-platform previewer.

In order to attain the objects suggested above, there is provided, according to one aspect of the invention a method, system, and apparatus for emulating on a single display platform an application's user interface as it would appear on each of a number of target devices, given a set of device characteristics for any device to be emulated and a formal description of one or more applications to be emulated. The method includes combining a selected one or more of the device characteristics and a selected one of the application formal descriptions and providing a simultaneous and consistent display representation for the selected application, thereby providing a stylized rendering of the selected application's interface in a uniform appearance and in which the selected application's interface for a plurality of the target devices can be simultaneously viewed.

According to a second aspect of the invention, there is disclosed a signal-bearing medium tangibly embodying a program of machine-readable instructions executable by a digital processing apparatus to emulate on a single display an application's user interface as it would appear on each of a number of target devices, given a set of device characteristics for any device to be emulated and a formal description of one or more applications to be emulated. The set of instructions includes a layout generator for combining a selected one or more of the device characteristics and a selected one of the application formal descriptions and a layout manager for providing a simultaneous and consistent display representation for the selected application.

With the invention, a graphic user interface for an application can be viewed on a display device in a simultaneous, consistent, and synchronized stylized rendering as a representation of the display on any number of target display devices.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 5A demonstrates typical content of a typical user-interface description file according to the present invention;

FIG. 5B demonstrates typical content of a typical device characteristics file according to the present invention, FIG. 5C demonstrates typical content of a typical toolkit description file according to the present invention;

FIG. 5D demonstrates typical contents of a typical device-specific layout specification file according to the present invention;

FIG. 9B shows a typical example of file format modifications to support the direct-manipulation changes to the greeked view, as illustrated by FIG. 9A.

FIG. 10 illustrates an exemplary hardware/information handling system 1000 for incorporating the present invention therein; and FIG. 11 illustrates a signal bearing medium 1100 (e.g., storage medium) for storing steps of a program of a method according to the present invention.

DETAILED DESCRIPTION OF PREFERRED EMBODIMENTS OF THE INVENTION

Figure 1:
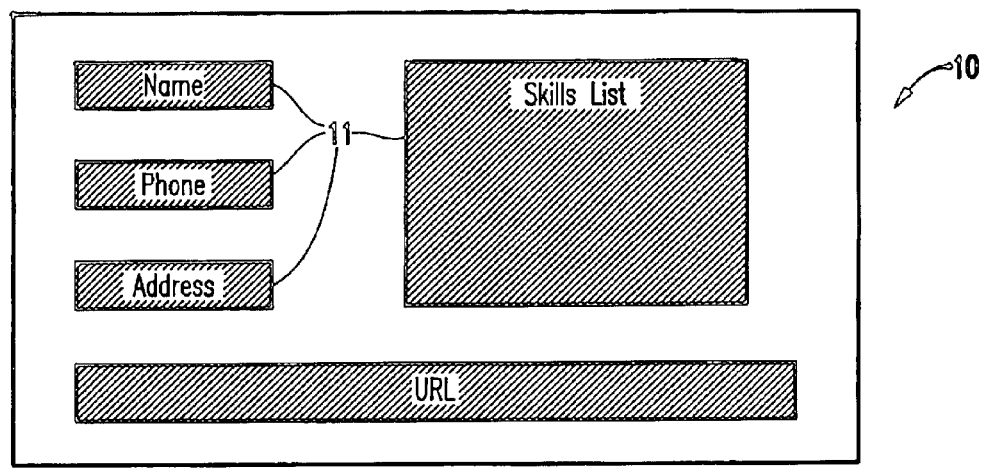
FIG. 1 shows an exemplary greeked user-interface representation.

Referring now to the drawings, and more particularly to FIG. 1, the method involves maintaining multiple synchronized views of the user-interface, and presenting a uniform representation in each view using a stylized rendering that is termed herein as "greeking". Usage of this term in the present application is an extension of the current meaning of greeking in which random letters or marks are used to show the overall appearance of a printed page without showing the actual text. With computers, greeking is currently typically used when a page to be 1previewed for printing is too small to be readable on the screen so as to display the layout without presenting all the details.

Similarly, the present invention uses a greeking representation to display the layout of an interface while hiding the details. FIG. 1 shows an example of a greeked interface 10. Note that each of the interface entities 11, referred to herein as "widgets", is displayed identically as a simple rectangle with a generic description of the contents. This abstracted presentation allows the designer to very quickly get a sense of the layout in terms of size and position of the interface items. The display device upon which the target device interface representation lo is viewed by a system developer is referred to as the "design display device" and would typically be, for example, a personal computer display or the like. It should be obvious that the stylized representation using rectangles and generic description labels shown in FIG. 1 is only one simple example, and that many other versions and combinations would also be able to provide the basic interface information. For example, a designer might be interested in only the relative sizes of the widgets and have no need for the generic labels.

Figure 2:
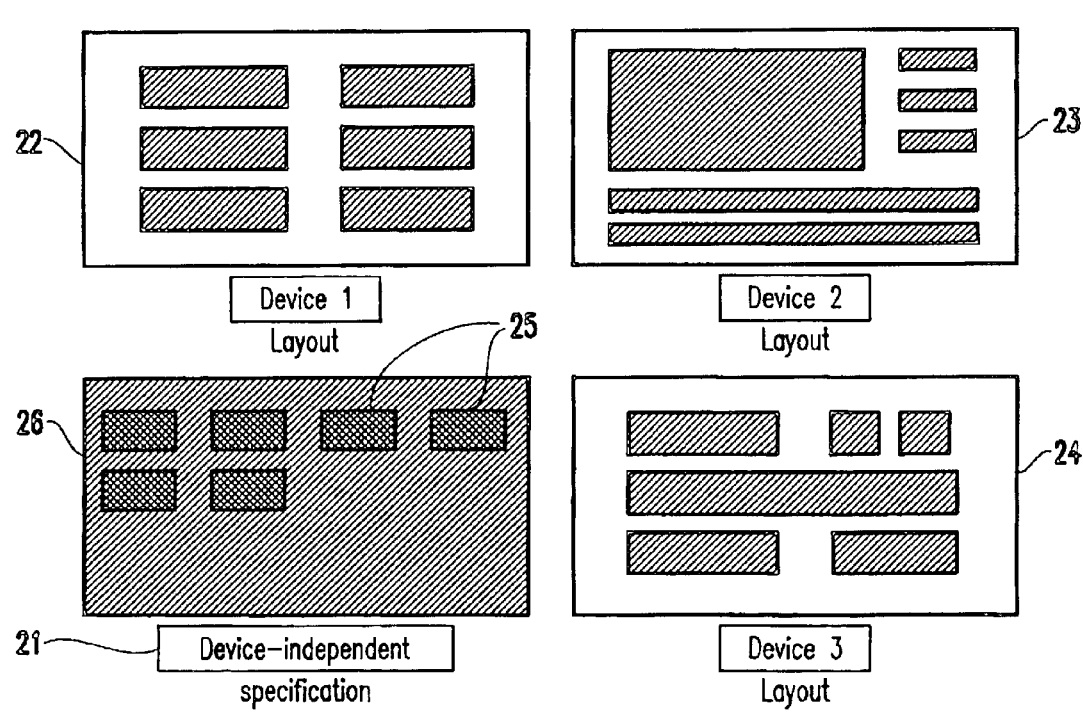
FIG. 2 shows examples of exemplary greeked representations for a single device-independent specification as it might appear on several target devices.

FIG. 2 shows an example using the invention in which a single device-independent specification 21 is converted into greeked representations for the layout as it would appear on three different devices 22, 23, 24. As described below, there is also linking between the different device views. Note that the six interface widgets 25 described by the device-independent specification appear in appropriate size and location on each of the three devices. By using a single, simple, consistent linked representation for user interfaces on all target devices, a single emulation engine allows an interface to be emulated as an abstract representation on any device that can be formally described using, for example, a standardized representation such as CC/PP (Composite Capabilities/Preference Profile) which is an Internet framework specifying how client devices express their capabilities and preferences to the web server that originates the content (reference URL: "www.w3.org/TR/CCPP-ra/" for more information on CC/PP). This simplification and abstraction is a key aspect of the invention. Depending upon the intended purpose, the representation 26 of the device independent specification 21 itself may or may not be rendered for viewing.

Figure 3:
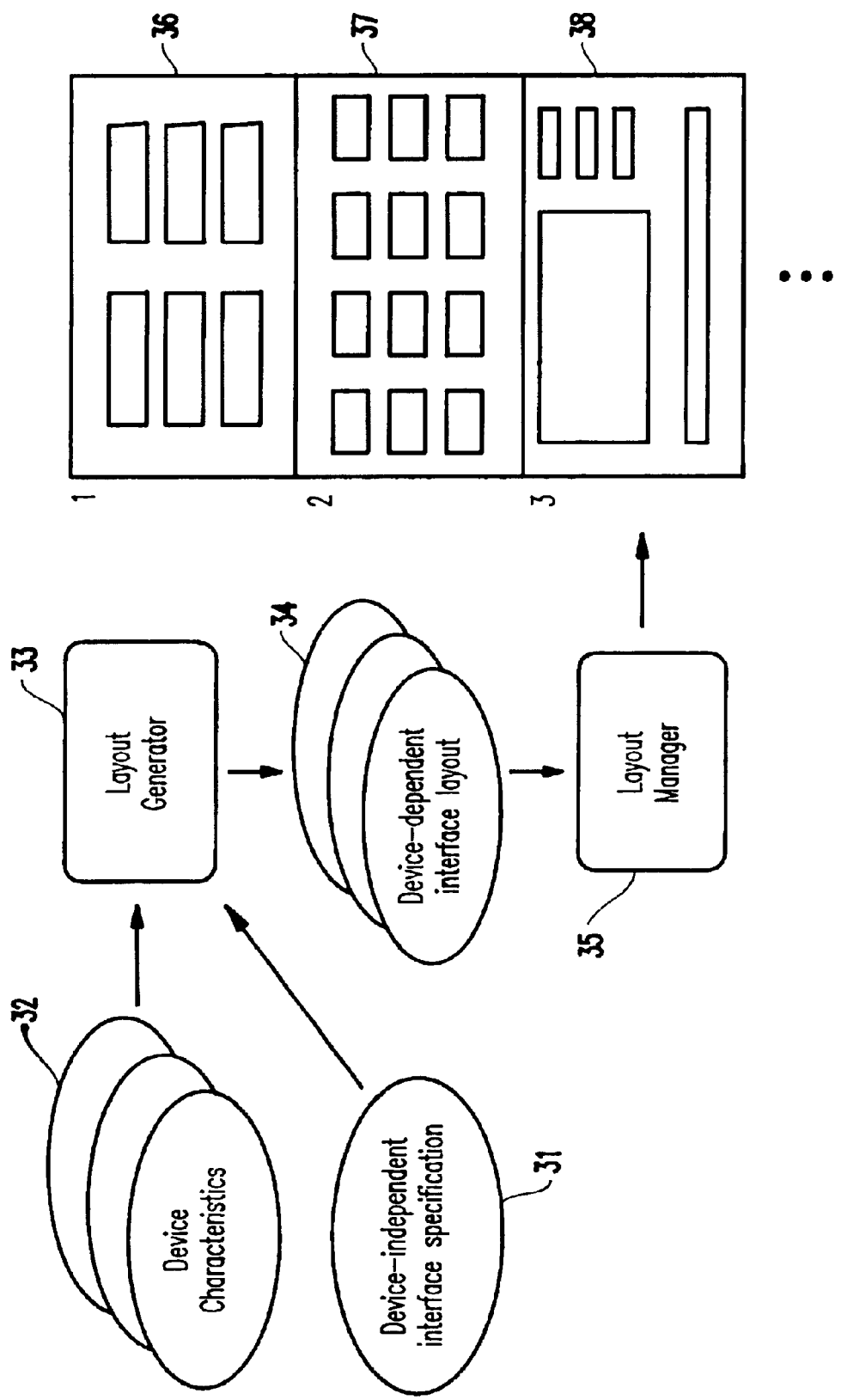
FIG. 3 shows an exemplary system architecture for a preferred embodiment of the invention.

FIGS. 3–11 show preferred embodiments of the present invention. FIG. 3 illustrates a block diagram of the invention according to a first preferred embodiment. The input includes at least one device-independent interface specification 31 and at least one corresponding set of device characteristics 32.

The device-independent interface specification 31 is a generic representation of the interface without any device-specific information. Information in this specification would include an abstraction description of each user-interface widget including an abstract type and generic properties, a suggested ordering for the widgets, general purpose constraints including things such as grouping and positioning, etc. The device-independent interface layout information may be textual, for example, XML (extensible markup language) or non-textual (i.e., binary) information in files on electronic storage media or may be represented internally in computer memory.

The device characteristics specification 32 provides information about the target device and GUI toolkit. This information may include, but is not limited to, such characteristics as screen size, screen resolution, default widget sizes, etc. The device characteristics may be textual (e.g., XML) or non-textual (i.e., binary) information in files on electronic storage media or may be represented internally in computer memory.

The device-independent interface specification and the set of device characteristics are input to layout generator module 33. The layout generator contains specification parsers, automated layout algorithms, and other components necessary to produce a set of device-specific interface layout specifications 34, (e.g., one specification per device in the device characteristics set). Thus, each device-specific interface layout provides information on the interface for a single device. This information may include, but is not limited to, widget types, widget placements, widget sizes, page break locations, etc, for that specific target device. It also contains a reference to the type of device on which the interface is to be displayed. It is noted that the device-specific interface layout information may be very specific (e.g., exact sizes/positions for each widget), or may be quite abstract and general (e.g., only widget types, but no size/positioning information, etc.), depending on the capabilities of the layout manager. The device-specific interface layout information may be textual (e.g., XML) or non-textual (i.e., binary) information in files on electronic storage media, or may be represented internally, in computer memory.

The layout manager 35 takes as an input one or more device-specific interface layout specifications 34. The layout manager 35 is essentially a renderer, and may also include an event manager if the output views are to allow for linked direct manipulation by the user. The output from the layout manager is one greeked layout view 36, 37, 38 per specification 34. This output may be directly displayable (e.g., a bitmap), or may be a symbolic layout specification (e.g., rectangle sizes and positions) for use by a lower-level rendering engine. Labels could be added as an option. Although the invention primarily addresses generation of multiple views of the same interface on multiple devices, a similar architecture could be readily devised that would permit viewing different interfaces on the same device, or different interfaces on different devices.

Figure 4:
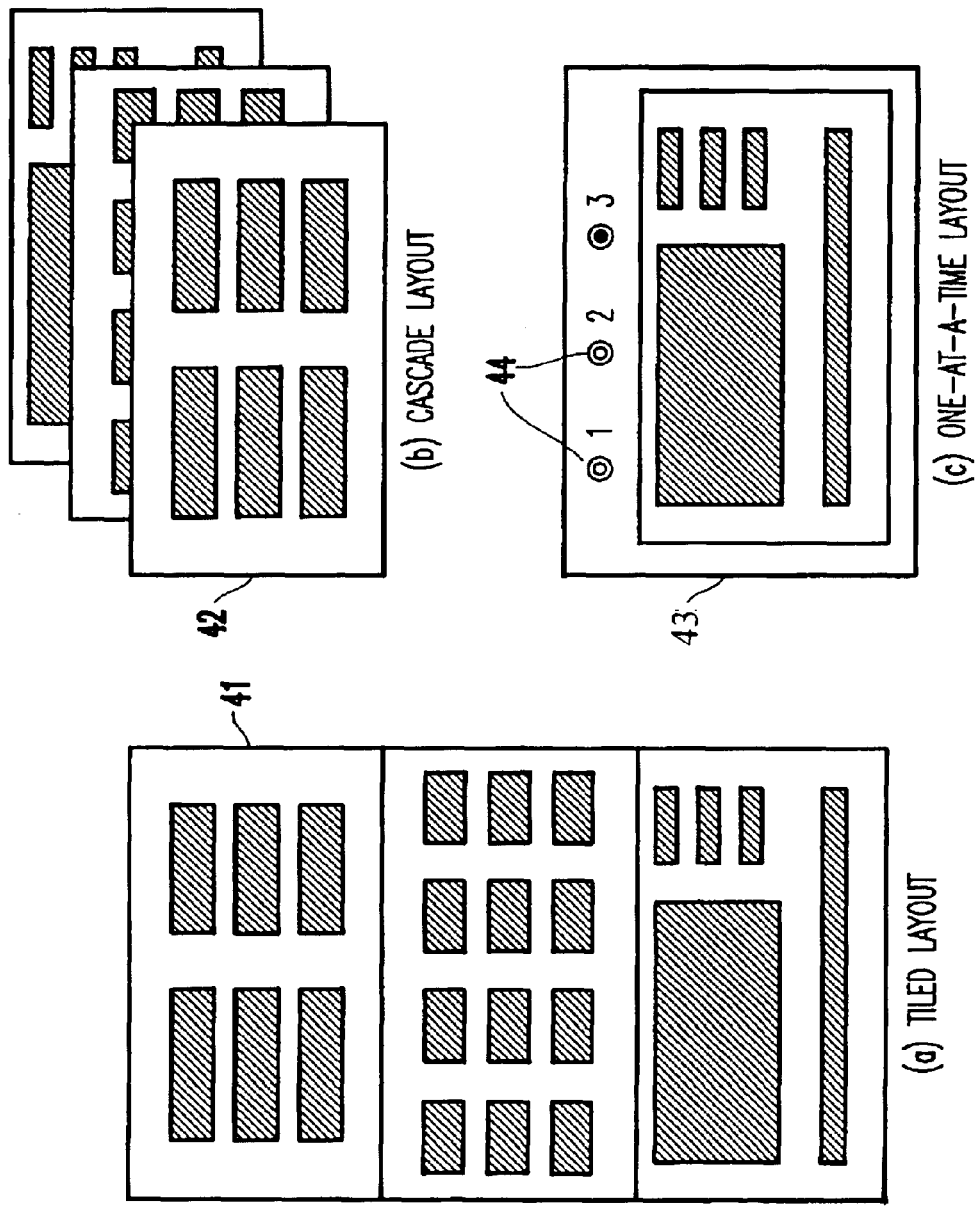
FIG. 4 shows exemplary alternate layouts for multiple linked greeked views of device-specific user-interfaces according to the present invention.

The final greeked multiple layouts may be managed in a number of different ways, as shown in FIG. 4. For example, they may all be presented simultaneously in a set of tiled windows 41 or cascaded windows 42. They may be stored internally, and presented one-at-a-time 43 through user selection such as a radio button 44. In this case, the layout generator and manager may produce greeked layouts in a "lazy" fashion, i.e., on demand.

A preferred embodiment of the invention, following the architecture of FIG. 3, is now described in detail. Note that a number of simplifications have been made for the purposes of exposition. A person of ordinary skill in the art will readily observe obvious extensions required for implementing this invention as well as refinements.

Figure 5:
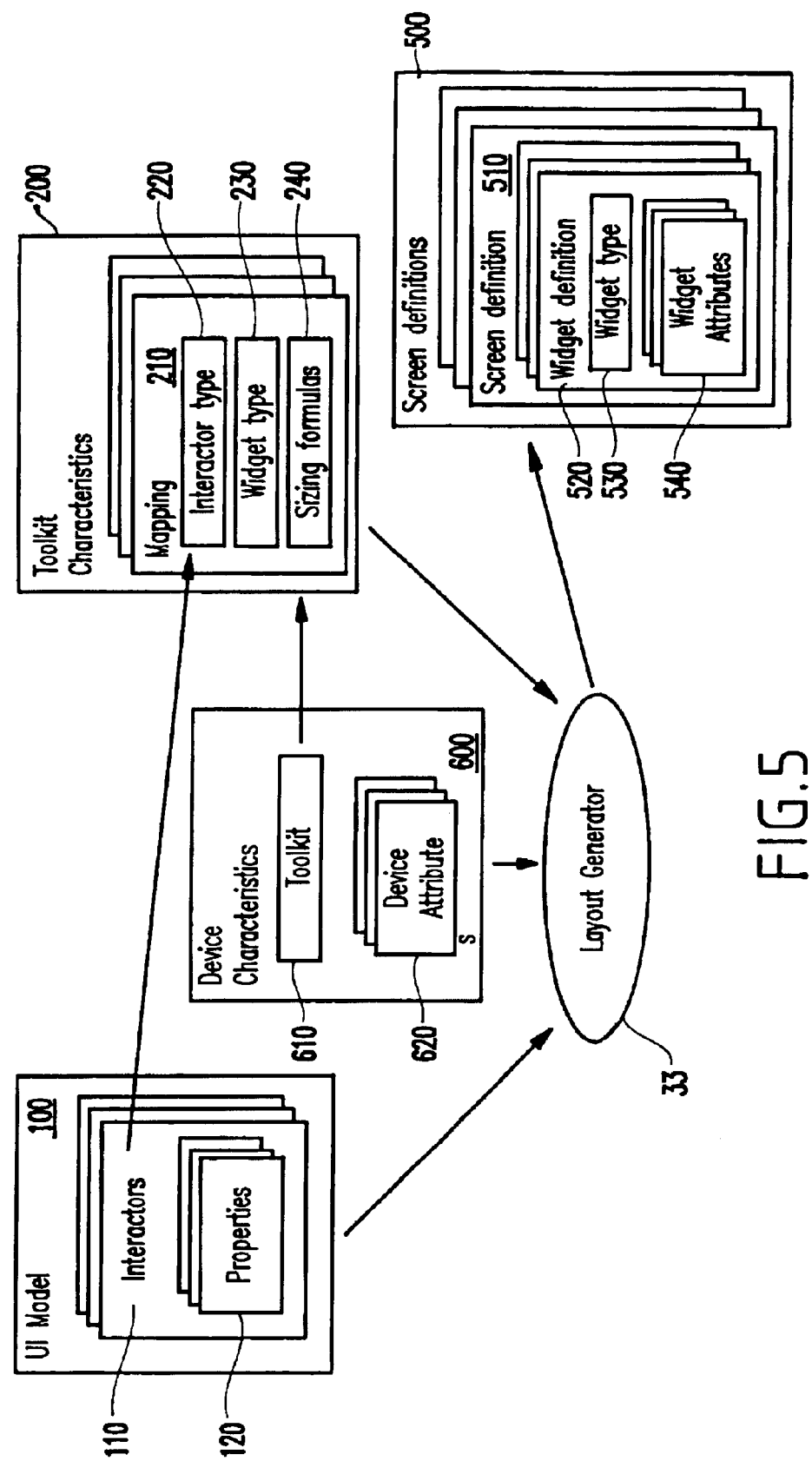
FIG. 5 shows inputs and outputs of the layout generator according to the present invention.

FIG. 5 shows details of the inputs and outputs for the Layout Generator 33. This module receives a plurality of inputs from a plurality (e.g., three) of input sources: including, for example, a generic user-interface description for an application 100, a set of device descriptions 600, one per device that is to be previewed, and a set of toolkit descriptions 200, one per toolkit to be used in generating device-specific rendering. Note that the device descriptions and toolkit descriptions can be stored either individually or together with no loss of generality. The Layout Generator 33 creates a set of screen definitions 500, one set per device to be previewed. Details of this figure will be described and referenced in the process descriptions below.

The User Interface (UI) Model 100 is a device-independent description (see also item 31 of FIG. 3) of an application user-interface. The UI Model 100 contains a set of Interactor descriptions 110, one per interactor type. An interactor is an abstract description of a user-interface element that accepts input from a user, displays output to a user, or does both. For example, an "Input" interactor, accepts input, and may show a label. Input would correspond to the class "TextField" in the java AWT toolkit, for example. Each interactor has a set of properties 120. These include the interactor type, as well as other properties, such as "label".

FIG. 5A gives an example of a UI Model description. A name 100 is specified followed by a set of interactor descriptions. Each interactor description begins with a name and a type 110, 130, 160, followed by a set of properties 120, 140, 150, 170, 180. Each property is a name, value pair. In this example can be seen two types of interactors, an "Input" interactor 110–120 that is used for entering a field of information, and a "Selectable List" interactor 130–150, 160–180, which is used for selecting one or more items from a list. Input interactors are typically realized as type-in fields on specific devices. Selectable Lists may be realized as popup menus, as choice lists, etc. Properties include items such as the label to be displayed with the interactor 120, 140, 170, or a flag indicating whether a list should allow the selection of only one or of multiple items 150, 180.

FIG. 5B shows an example of the device characteristics file 32 shown in FIG. 3. This file contains the name of the device 100, the toolkit that is to be used for rendering 110 and the physical dimensions of the display 120. This file might also contain information about other physical properties, such as number of hard buttons (function keys).

FIG. 5C shows an example of the toolkit description file, which is a subcomponent of item 32 shown in FIG. 3. The file specifies the name of the toolkit 100, and a set of mapping definitions. Each mapping definition describes the mapping from a single interactor (an abstract element, specified in the UI Model) to a single widget (a concrete element, which can be rendered). The mapping definition specifies an interactor type, and a widget type 100, 130 followed by a set of sizing formulas 110, 120, 140, 150. Each sizing formula calculates a property of the widget, for example, "Width" 110 for the EntryField widget. The sizing formulas use properties, for example, "label.numChars" which specifies the property "label" and a special operator "numChars" that retrieves the number of characters, whose values are defined in the UI Model.

FIG. 5D shows an example of a device-specific layout specification file 34 (FIG. 3) produced by the layout generator. This file specifies the UI Model (application), the target device, and the toolkit 100. This is followed by a set of screen definitions 110–200, 210–260. A screen definition has a header 110, 210 followed by a set of widget definitions. A widget definition defines a widget type 120, 160, 220, the concrete widget that is to be rendered for that device/toolkit combination. Following this is a set of attribute definitions 130, 140, 150, 170, 180, 190, 200, 230, 240, 250, 260. Each attribute definition includes a name/value pair. The name refers to a property of the concrete widget, and the value is the value to be assigned to that property. Such assignment might be through a "JavaBeans"-like mechanism (e.g., the attribute "Label" is assigned using a method called "setLabel"), or other invocation mechanisms.

An example of the layout generator processing is described by the pseudocode below and in flowchart format in FIG. 5E. The description refers back to the block diagram in FIG. 5. Note that many different layout algorithms are possible, implementing a wide variety of layout policies. The following process description is only one simple exemplary example.

Figure 5E:
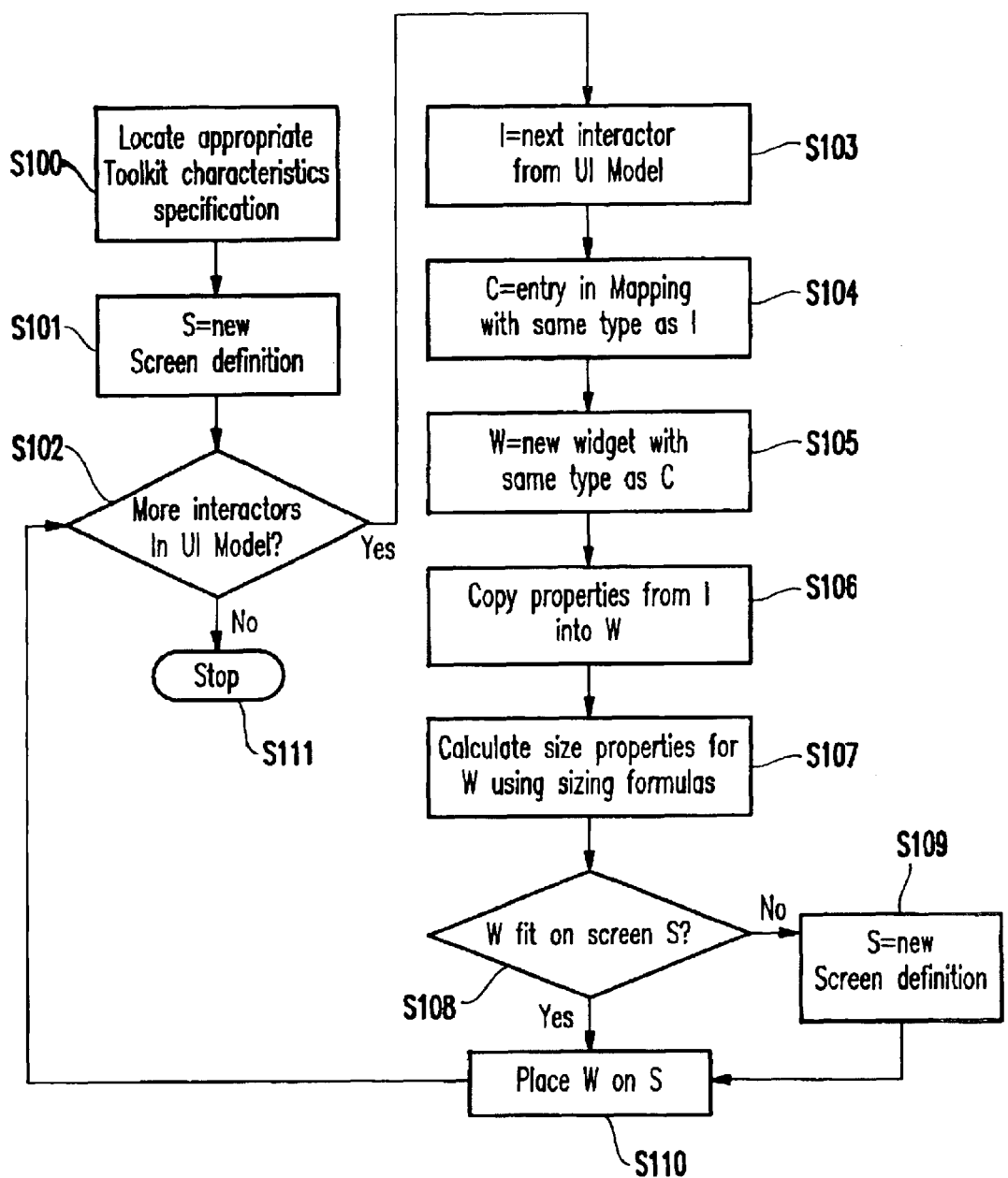
FIG. 5E is a flowchart of an exemplary layout generator process according to the present invention, FIG. 6 demonstrates a typical example of inputs and outputs for the layout generator according to the present invention, FIG. 7 demonstrates a typical example of inputs and outputs for the layout manager according to the present invention.
Figure 6:
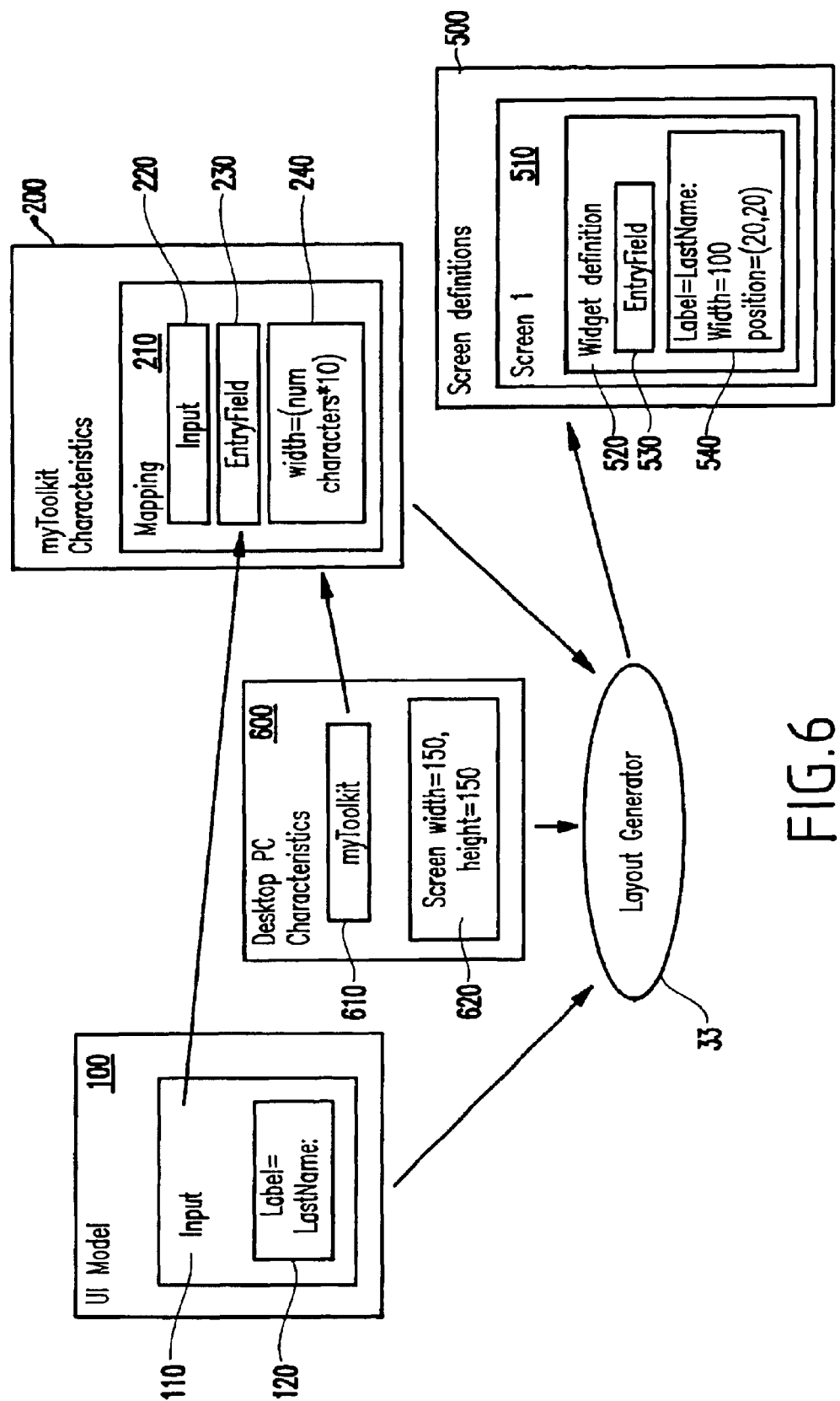

Using the Toolkit designation (610) in the Device Characteristics specification (600), locate the appropriate Toolkit Characteristics specification (200) [reference S100 on FIG. 5E flowchart]
Start a new Screen definition (510) [S101]
For each interactor definition (110) in the UI Model definition (100) [S102, S103, S111]
{
  Find the Mapping entry (210) corresponding to this Interactor (110) by matching its type against the Interactor type (220). [S104] This defines a concrete realization of the abstract Interactor. The type of the realization is specified by the Widget type (230).
  Create a Widget Definition (520) for the current Interactor. [S105] Assign the Widget Type (530) using the Widget Type (230) from the Mapping (210).
  Retrieve the Properties (120) from the Interactor (110) and copy into the Attributes (540) of the Widget Definition. [S106]
  Retrieve size properties from the Properties (240). Use these to calculate the size of the widget by applying the sizing formulas (240). [S107] These formulas specify widget sizes (usually in pixels) based on size properties such as maximum number of characters. For example: width=10*(maximum number of characters)+20
  If the concrete realization of the widget will not fit in the new screen (based on the size attributes just calculated) start a new Screen definition (510). [S108, S109]
  Place the Widget Definition (520) in the current Screen definition (510). [S110]
}
FIG. 6 shows an example of the above process in which layouts are created for an application specified by an abstract UI Model 100, to be displayed on a Desktop PC, using the Java® AWT library to do the UI Rendering. The characteristics of the Desktop PC used here as the design display device are specified in 600, which points to an AWT Toolkit Characteristics file 200. The UI Model 100 contains an Interactor definition 100 for an abstract Interactor of type "Input". By matching this type against the interactor type 220 in the mappings 210 within the toolkit description 200, a mapping can be established to concrete toolkit widget called EntryField 230. Using the "label" property 120 from the UI Model, and the sizing formula 240 from the toolkit characteristics file, a size for the EntryField widget is calculated. This size is used to position the widget on the screen, relative to its boundaries. Its size, position, and other properties, such as "label", 540 are stored in the widget definition 520. The widget definition also contains the concrete toolkit widget type 530, and is stored in a screen definition 510. The screen definition will contain all of the widgets that "fit" on a single screen of the target device. The screen definitions set 500 contains as many screen definitions 510 as required for rendering the application on this particular device/toolkit combination.

Figure 7:
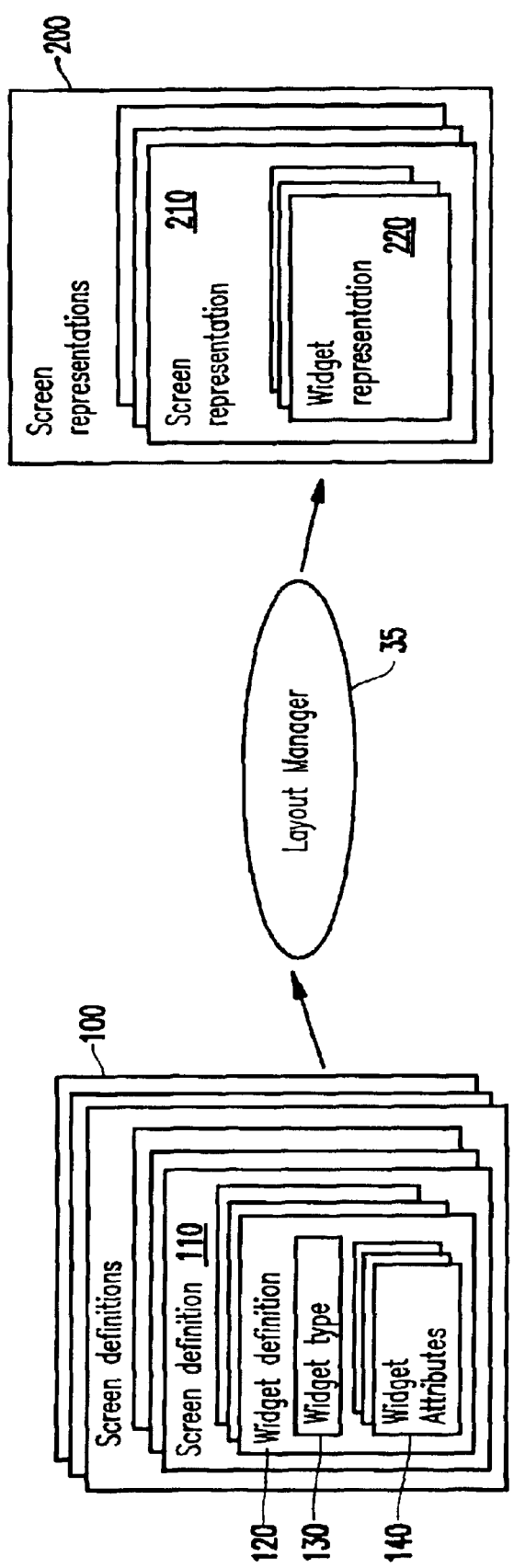

FIG. 7 shows the inputs and outputs for the layout manager 35. This component is responsible for rendering the device-specific screen definitions 100 produced by the layout generator and creating screen representations, the renderings 200, from them. Typically, there will be a single screen representation displayed for each device/toolkit combination provided in the set of screen definitions, but this need not be the case. Other implementations may provide for simultaneous multiple screens displayed from a single device, or any combination of these two options.

Each set of screen definitions 100 contains one or more screen definitions 110 for a particular device/toolkit combination. The structure of the screen definitions has been described above. Screen representations 200 are greeked representations of the user-interface on different devices. Each screen representation 210 contains a set of widget representations 220. In the greeked representation, these are simply on-screen rectangles, each rectangle representing the size and location of a particular user-interface widget.

Figure 8:
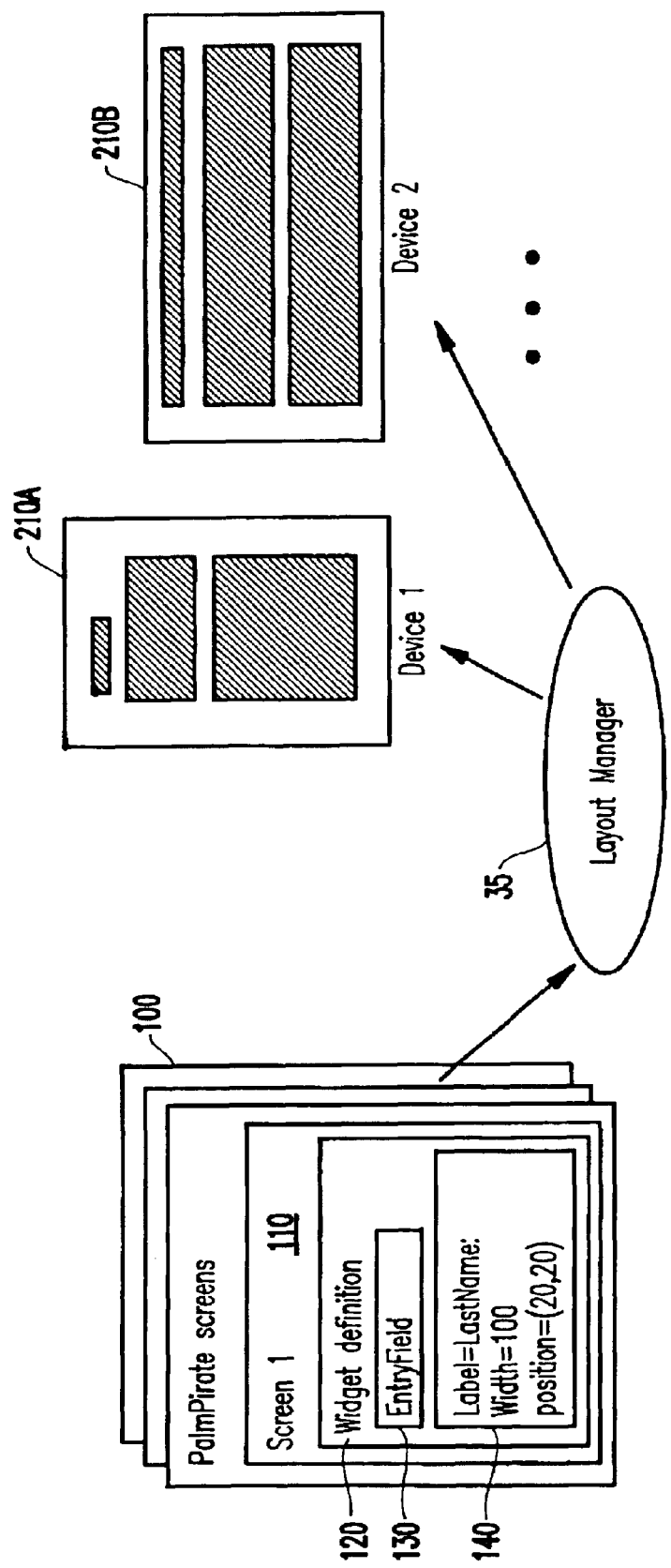
FIG. 8 demonstrates the layout manager inputs and outputs for two target devices according to the present invention.

The layout manager 35 uses standard rendering techniques to produce a display. Individual screen definitions 110 to be displayed are selected based on user choice, or other selection mechanisms. For each screen definition 110, the widget definitions 120 are read. The widget attributes 140 contain size and location information used to render the greeked representation of the widget 220. FIG. 8 shows a specific example with layout manager 35 generating a device 1 representation 210A and device 2 representation 210B.

Second Embodiment

Figure 9A:
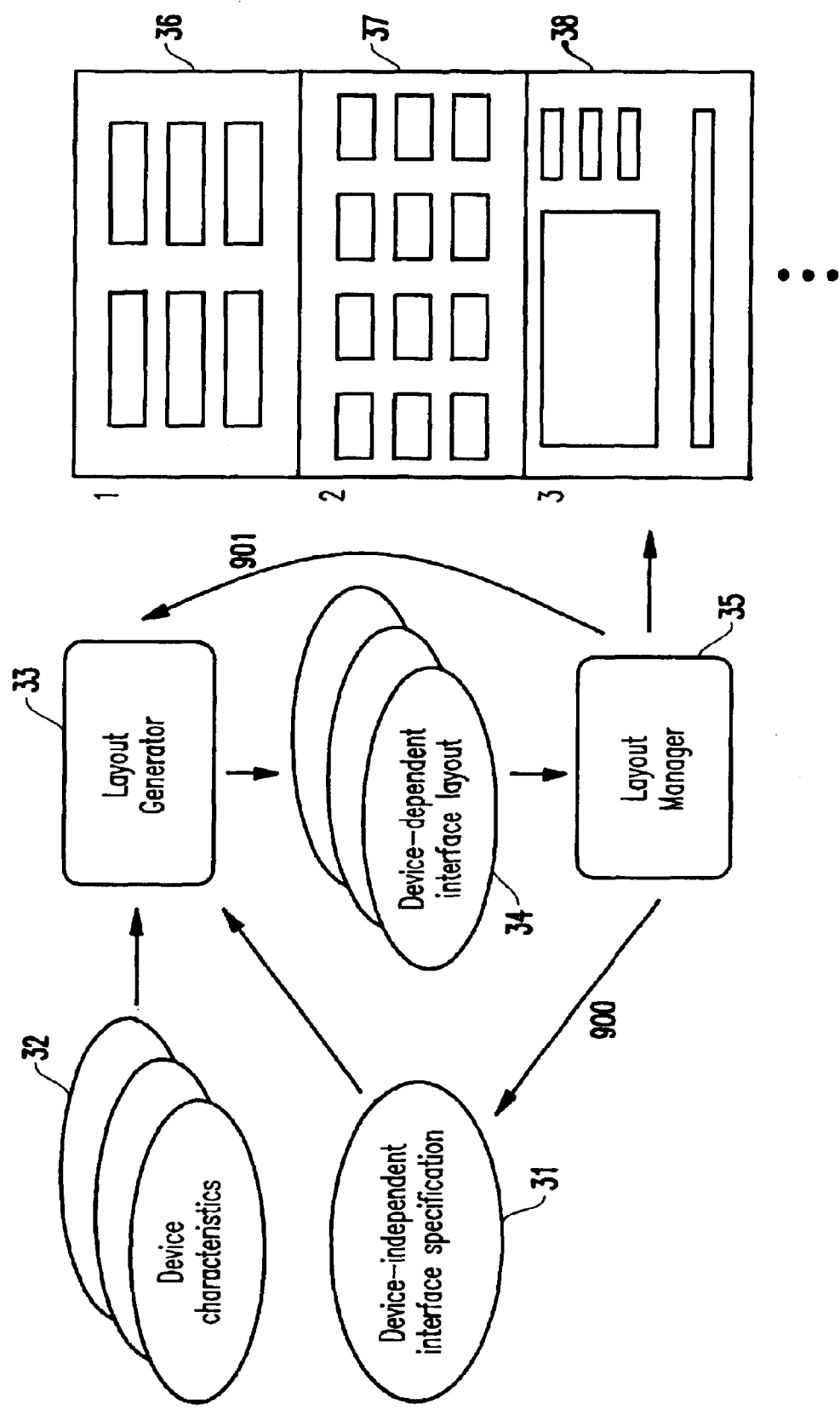
FIG. 9A shows a second preferred embodiment of the present invention in which the system architecture is modified to support direct manipulation update of the device-independent specification via greeking views with simultaneous linked update of all views.

An alternate architecture presented with minor modification and shown in FIG. 9A provides a second exemplary embodiment of the invention. This embodiment provides for direct-manipulation of the greeked view with simultaneous update of all view for all devices. The modified architecture is shown in FIG. 9A. FIG. 9A is identical to that in FIG. 3, with the addition of two arrows 900, 901, shown in black. The first arrow 900 represents changes to the device-independent interface specification (UI Model) 400 that are required. For changes in the greeked views 36, 37, 38, which represent device-specific layouts 34 to reflect back in the device-independent specification 31, pointers are added from the device-dependent specification 34 to corresponding items in the device-independent specification.

This correspondence is shown in FIG. 9B. The entries here are identical to those previously presented in FIG. 5D, with the addition of an object identifier ObjID in the device-specific layout specification 220, matching the one in the device-independent specification 110. Using that correspondence, the layout manager 35 can produce appropriate modifications, such as reordering of interactors or changes to properties, to the device-independent interface specification.

A second addition is a control path 901 allowing the layout manager 35 to invoke the layout generator 500. When changes to any of the device-dependent specification 34 have been initiated, a complete set of device-dependent layouts 34 must be recomputed, and then the layout manager 35 uses these to redisplay the greeking view 36,37,38.

FIG. 10 illustrates a typical hardware configuration of a computer system (e.g., as an emulator or use with the present invention) and which preferably has at least one processor or central processing unit (CPU) 1011.

The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer 1039 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1011 and hardware above, to perform the method of the invention.

This signal-bearing media may include, for example, a RAM contained within the CPU 1011, as represented by the fast-access storage for example. Alternatively, the instructions may be contained in another signal-bearing media, such as a magnetic data storage diskette 1100 (FIG. 11), directly or indirectly accessible by the CPU 1011.

Whether contained in the diskette 1100, the computer/CPU 1011, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

The invention described above provides a number of valuable benefits. Using the invention, there is no need to download and run separate emulators for each target platform. All views can be seen at once and the views are consistent and synchronized. The invention makes it easy to preview new devices, even if emulators are not available.

The invention lends itself particularly well to multiple platform environments such as development tools for multi-platform devices or for development of new devices. It can also provide a valuable tool for integrated software development or could be used as a simple stand-alone multi-platform previewer.

While the invention has been described in terms of preferred embodiments, those skilled in the art will recognize that the invention can be practiced with modification within the spirit and scope of the appended claims.

What is claimed is:

1. A method for emulating on a single display platform an application's user interface as it would appear on each of a number of target devices, given a set of device characteristics for any device to be emulated and a formal description of one or more applications to be emulated, said method comprising:

combining a selected one or more of said device characteristics and a selected one of said application formal descriptions; and providing a simultaneous and consistent display representation for said selected application, thereby providing a stylized rendering of said selected application's interface in a uniform appearance and in which said selected application's interface for a plurality of said target devices can selectively be viewed simultaneously.

2. The method of claim 1, wherein said display representation is synchronized, thereby providing a simultaneous update to all of said selected target device representations when information in a device-independent portion of said formal description is changed.

3. A method for emulating on a single display platform an application's user interface as it would appear on a target device, said method comprising:

combining device characteristic information for said target device and a formal description information for said application; and providing a stylized rendering of said application's interface.

4. The method of claim 3, wherein said device characteristic information is given for a plurality of target devices to be emulated, further comprising:

selecting certain of said plurality of target devices to emulate; and providing a simultaneous and consistent display representation for said application, thereby providing a stylized rendering of said applications interface in a uniform appearance and in which the application's interface for said selected plurality of said target devices can selectively be viewed simultaneously.

5. A method to emulate on a single display platform an appearance of a user-interface of any of at least one application as it would appear on a plurality of target device, wherein a set of device characteristics for any said target device to be emulated and a formal description of any said application to be emulated is available in a memory, said method comprising:

retrieving from said memory a device-independent specification information for a user interface for a selected application;

retrieving from said memory a device-dependent information for said selected application for a selected one or more of said target devices; and combining said device-independent specification information and said device-dependent information into a single format for a stylized representation on a display device.

6. The method of claim 5, further comprising:

forming said display device presentation such that said stylized representation of said plurality of target devices can selectively be viewed on said display device individually or in a simultaneous view involving more than one said target device stylized representation.

7. The method of claim 6, wherein said combining of said device-independent model information and said device-dependent information is synchronized, thereby causing all said simultaneous views to simultaneously change whenever said device-independent specification information is changed.

8. The method of claim 5, wherein said single format is used to render an abstract representation of said appearance of said user-interface for said selected target device.

9. The method of claim 8, wherein said abstract representation comprises a polygonal area for each of a user-interface entity in said user-interface.

10. The method of claim 8, wherein said abstract representation comprises a text field describing a generic content of each of a user-interface entity in said user-interface.

11. The method of claim 5, wherein said selected application comprises a plurality of views for said user interface.

12. The method of claim 11, wherein said presentation can provide a simultaneous view of more than one view of said application user interface.

13. The method of claim 12, wherein said more than one view is presented in one of the following formats:

a tiled layout;

a cascaded layout; and a one-at-a-time layout having operator selection to select a view.

14. The method of claim 6, wherein said simultaneous view is presented in one of the following formats:

a tiled layout;

a cascaded layout; and a one-at-a-time layout having operator selection to select a view.

15. A system to emulate on a single display an application's user interface as it would appear on each of a number of target devices, given a set of device characteristics for any device to be emulated and a formal description of one or more applications to be emulated, said system comprising:

means for combining a selected one or more of said device characteristics and a selected one of said application formal descriptions; and means for providing a simultaneous and consistent display representation for said selected application.

16. The system of claim 15, further comprising:

means for synchronizing said display representation when information in a device-independent portion of said formal description is changed.

17. An apparatus to emulate on a single display an application's user interface as it would appear on each of a number of target devices, given a set of device characteristics for any device to be emulated and a formal description of one or more applications to be emulated, said apparatus comprising:

a layout generator for combining a selected one or more of said device characteristics and a selected one of said application formal descriptions; and a layout manager for providing a simultaneous and consistent display representation for said selected application.

18. The apparatus of claim 17, wherein said layout generator further synchronizes said display representation when information in a device-independent portion of said formal description is changed.

19. A signal-bearing medium tangibly embodying a program of machine-readable instructions executable by a digital processing apparatus to emulate on a single display an application's user interface as it would appear on each of a number of target devices, given a set of device characteristics for any device to be emulated and a formal description of one or more applications to be emulated, said set of instructions comprising:

a layout generator for combining a selected one or more of said device characteristics and a selected one of said application formal descriptions; and a layout manager for providing a simultaneous and consistent display representation for said selected application.

20. The medium of claim 19, wherein said layout generator further synchronizes said display representation when information in a device-dependent portion of said formal description is changed.

21. A signal-bearing medium tangibly embodying a program of machine-readable instructions executable by a digital processing apparatus to emulate on a single display and application's user interface as it would appear on each of a number of target devices, given a set of device characteristics for any device to be emulated and a formal description of one or more applications to be emulated, said set of instructions comprising:

combining a selected one or more of said device characteristics and a selected one of said application formal descriptions; and providing a simultaneous and consistent display representation for said selected application, thereby providing a stylized rendering of said selected application's interface in a uniform appearance and in which said selected application's interface for a plurality of said target devices can selectively be viewed simultaneously.

22. A signal-bearing medium tangibly embodying a program of machine-readable instructions executable by a digital processing apparatus to emulate on a single display an application's user interface as it would appear on each of a number of target devices, given a set of device characteristics for any device to be emulated and a formal description of one or more applications to be emulated, said set of instructions comprising:

combining device characteristic information for said target device and a formal description information for said application; and providing a stylized rendering of said application's interface.

23. A signal-bearing medium tangibly embodying a program of machine-readable instructions executable by a digital processing apparatus to emulate on a single display an application's user interface as it would appear on each of a number of target devices, given stored in a memory a set of device characteristics for any device to be emulated and a formal description of one or more applications to be emulated, said set of instructions comprising:

retrieving from said memory a device-independent specification information for a user interface for a selected application;

retrieving from said memory a device-dependent information for said selected application for a selected one or more of said target devices; and combining said device-independent specification information and said device-dependent information into a single format for a stylized representation on a display device.

24. A signal-bearing medium tangibly embodying a program of machine-readable instructions executable by a digital processing apparatus to emulate on a single display an application's user interface would appear on each of a number of target devices, given stored in a memory a set of device characteristics for any device to be emulated and a formal description of one or more applications to be emulated, said set of instructions comprising:

means for combining a selected one or more of said device characteristics and selected one of said application formal descriptions; and means for providing a simultaneous and consistent display representation for said selected application.

* * * * *